United States Patent

[11] 3,607,848

[72] Inventors Vladimír Stoy;
Richard Chromeček; Zdenek Tuzar; Miroslav Stol; Karel Kliment; Jaroslava Otoupalova; Miloslav Bohdanecky, all of Prague, Czechoslovakia
[21] Appl. No. 746,735
[22] Filed July 23, 1968
[45] Patented Sept. 21, 1971
[73] Assignee Ceskoslovenska akademie ved
Prague, Czechoslovakia
[32] Priority Aug. 7, 1967
[33] Czechoslovakia
[31] PV 5701-67

[54] METHOD FOR PREPARING INSOLUBLE, CROSS-LINKED ORGANIC HYDROGELS COMPRISING COPOLYMERS OF GLYCOL MONOESTERS WITH DIESTERS
6 Claims, No Drawings

[52] U.S. Cl................................................. 260/86.1,
106/15, 117/121, 117/124, 117/138.8, 117/140, 117/155, 167/87, 167/90, 167/94, 204/159.16, 260/32.6, 260/33.4, 260/41, 260/885

[51] Int. Cl...................................................... C08f 15/18
[50] Field of Search............................................ 260/86.1 E, 89.5, 885; 204/159.16

[56] References Cited
UNITED STATES PATENTS

| | | | |
|---|---|---|---|
| 2,946,776 | 7/1960 | Scott et al.............. | 260/88.7 |
| 3,218,305 | 11/1965 | Krieble.................. | 260/89.5 |
| 3,400,103 | 9/1968 | Samour et al.......... | 260/78 |

*Primary Examiner*—Harry Wong, Jr.
*Attorney*—Richard Low

ABSTRACT: Insoluble hydrogels are prepared by cross-linking linear or branched soluble copolymers of glycol methacrylates or glycol acrylates with glycol dimethacrylates or glycol diacrylates, preferably in presence of glycol acrylate or glycol methacrylate monomers which may contain the respective diester, and preferably also in presence of initiators liberating free radicals, and in presence of solvents having the interaction parameter $\chi$. Soluble glycol methacrylate or acrylate polymers can be used in form of fine solid particles and the cross-linking may be aided by heating till to about 150° C.

METHOD FOR PREPARING INSOLUBLE, CROSS-LINKED ORGANIC HYDROGELS COMPRISING COPOLYMERS OF GLYCOL MONOESTERS WITH DIESTERS

It is know to prepare insoluble hydrogels by copolymerizing glycol acrylate or glycol methacrylate monomers (or other hydrophilic monomers such as methacrylamide or acrylamide) with less than 2 percent of cross-linking agents which are soluble in the monomer mixture (see e.g. U.S. Pat. Specifications No. 2,976,576 and 3,220,960). The copolymerization may be carried out in presence of water or of another swelling agent miscible with water such as ethylene glycol or glycerol. Finally, the hydrogel articles are swollen to equilibrium with aqueous electrolyte solutions which are isotonic with living human tissue. They may be then used for manufacturing contact lenses, various prostheses, pessars, implants containing biologically active substances, coatings of artificial dentures, coatings of surgical catheters and other articles which are used in contact with tissues or mucous membranes of living human body. Moreover, said hydrogels may be used also for various technical purposes such as for sizing synthetic fibers for manufacturing membranes for dialysis etc.

For many purposes the hydrogels have to be prepared in situ by copolymerizing the above said monomers in a mold ("polymerization casting"). The shrinking caused by polymerization and the excessive heat liberated thereat are the main trouble occuring in the polymerization casting process, particularly if comparatively large castings are manufactured. If, however, thin layers of the hydrogel are to be made, it is absolutely necessary to exclude oxygen in order to avoid inhibition of the polymerization.

the application of monomeric mixtures with added initiators caused also trouble, their viscosity being at first very low. At the beginning of the copolymerization the viscosity increases, but the time during which the viscosity is suitable for being applied to is too short. After several minutes the viscosity increases steeply and after a short period of time the mixture gelifies irreversibly to a insoluble hydrogel.

On the other hand, it is known from the French Patent Specification No. 1,523,779 and also from copending Application Ser. No. 639,021) filed may 17, 1967 cross-linked either linear or branched soluble copolymers of glycol methacrylates or glycol acrylates with the respective diesters by carrying out the copolymerization in presence of good solvents having the interaction parameter $\chi$ with respect to the polymer thus formed less than 0.5.

Copolymers of this sort are soluble in good solvents such as in lower aliphatic alcohols but insoluble in water. They may be used for many purposes such as for making especial hairsprays, for manufacturing impregnated surgical material for dressing wounds, for cosmetic purposes, for preserving foods, tobacco and perfumes etc. but their noncrosslinked structure causes their inclination to cold flow or creep that is a disadvantageous e.g. for their application for coating ships (where they inhibit the growth of shells and of the undesirable organisms).

It is an object of the invention to prepare liquid or semiliquid preparations having a sufficiently long "pot-life" when polymerization catalyst or initiator has been added thereto, and yielding finally cross-linked insoluble hydrogels of the kind which has been, until now, manufactured by direct copolymerization. Another object of the invention is to provide a method for preparing cross-linked hydrogels where the shrinking caused by polymerization is largely decreased, and amount of heat liberated during the copolymerization substantially reduced.

A still further object of the invention is to provide easily applicable polymer solutions which can be subsequently transformed into insoluble cross-linked hydrogels of the kind described above.

The method according to the invention consists in preparing insoluble, cross-linked organic hydrogels based on copolymers of mono-olefinic hydrogphilous monomers selected from the group consisting of glycol monoacrylates and glycol monomethacrylates, with a minor amount of glycol diacrylates or glycol dimetharcylates, by subsequently cross-linking soluble, noncrosslinked copolymers of the same monomers, which have been prepared by carrying out the copolymerization in presence of good solvents having the interaction parameter $\chi$ with respect to the polymer thus obtained lower than 0.5.

Said method is carried out by removing at least a substantial amount of the said good solvent and then maintaining said soluble copolymers at the cross-linking temperature for a sufficient period of time. The cross-linking may be advantageously aided by following measures, applied to either separately or simultaneously in any desired combination:

1) Adding polymerization catalysts or initiators liberating free radicals;

2) Adding the respective monomers, namely glycol monoacrylates or glycol monomethacrylates, which may contain a minor amount of the respective diesters, or other preponderantly mono-olefinic monomers capable of being copolymerized with the said soluble copolymers. 3) Adding "bad" solvents or swelling agents having the interaction parameter $\chi$ with respect to the polymer thus formed higher than 0.5. 4) Irradiating with ionizing rays (U.V., X- or Gamma-rays). 5) Heating the mixture to temperatures from about 85° C. up to about 200° C.; Temperatures higher than 200 C. can be also used for a short time if needed.

Said measures may be carried out in various ways. A preferred embodiment consists in adding a peroxidic compound or another generator of free radicals to the dissolved or powdered soluble, noncrosslinked polymer, mixing the mixture with the respective monomer or monomer mixture, and, if desired, with a "bad" solvent or diluent bringing the mixture thus obtained into a modl or into an extruder or similar, and heating it to the cross-linking temperature while molding or extruding it. If the cross-linking should be performed rapidly and at ambient or only slightly increased temperature, a suitable reduction agent such as dimethyl aniline or dimethylaminoethyl acetate may be added to the monomeric component. A rapidly polymerizing redox system is thereby formed. The monomer is preferably used in a mixture with a "bad" solvent which has the interaction parameter $\chi$ higher than 0.5 so that the cross-linking is not hindered. The most convenient bad solvent is water, although many other band solvents listed in the second half of the last table of the above cited French Patent Specification might be used as well if desired.

Whenever the disclosure refers to glycols, it is to be understood that any hydrophilic dihydric alcohols may be used, such as monoethylene glycol, diethylene glycol, triethylene glycol and other higher polyethylene glycols and their mixtures, further 1.2 -propylene glycol, 1.3-propylene glycol, 1.4-butylene glycol. Instead of glycols, it is also possible to use monoolefinic esters of acrylic and methacrylic acid with glycerol or with othepolyols, although it is somewhat difficult to prepare sufficiently pure monesters thereof.

Addition of polymerization initiators shortens the time required for the cross-linking and lowers the necessary temperature.

Addition of copolymerizable monomers aids the cross-linking making the double bonds on the soluble polymer more accessible. Double bonds are incorporated with the glycol diacrylate or dimethacrylate component, probably in the form of vinyl-ester side groups. The monomer which is added for cross-linking is preferably of another kind that used for preparating the soluble copolymer.

Addition of "bad" solvents (swelling agents with respect to the polymer thus formed) enhances the cross-linking, making the polymer chains and their unsaturated side-groups more mobile and better accessible by unfolding them by their solvating activity.

Access of oxygen must be avoided particularly if a thin layer of the polymer solution is to be powdered in presence of the monomeric glycol acrylate or methacrylate. The present method makes possible to manufacture even large castings having complicated or complex shape, the occurrence of depressions or cavities caused by shrinking and gas bubbles by excessive heat of polymerization being avoided.

Such mixtures fill up well the mold and the powedered or granulated soluble polymer is rapidly dissolved prior to the cross-linking or during it, if the mixture in the mold is heated, preferably to temperatures above 120° C. Increased pressure also adds to suppressing gas bubbles in the moded article.

Inert fillers such as finely powdered silica can be also added prior to the cross-linking if desired.

If the mixture contains, in addition to the soluble polymer, also monomeric glycol methacrylate or -acrylate or another preponderantly mono-olefinic monomer and an efficient polymerization initiator, the cross-linking can be carried out also at ambient temperature without heating. Mild heating enhances, however, the monogenization of the mixture. As polymerization initiators which are efficient at ambient temperature various redox systems can be used such as a persulfate (oxidizing agent) and diethylaminoethyl acetate or sodium thiosulfate as reducing agents. Persulfate is usually added to the soluble polymer of a glycol acrylate or -methacrylate, used either in powdered form or in a solution, and the reducing agent is added to the monomer or to the solvent or swelling agent. When using powdered glycol methacrylate or acrylate polymer with a peroxide or persulfate, and glycol methacrylate monomer with some reducing agent, the technique is similar to the known method of making artificial dentures from methyl methacrylate polymer powder and liquid monomer; the result is, however, quite different since methyl methacrylate polymer is incapable of being cross-linked in such a way. Moreover, its polymers are hydrophobic.

A detailed explanation of the chemical processes involved is not needed for attaining the desired result; it is supposed, however, that soluble copolymers of glycol monoacrylates or monomethacrylates with the respective diacrylates or dimethacrylates contain come polymerizable double bonds in side chains or end groups which participate on the cross-linking It is, however, probable that also other cross-linking mechanisms are involved, particularly such based on chain transfer, or perhaps also on the condensation of alcoholic side groups, forming ether bridges. In any case, however, the resulting cross-linked insoluble gel is very similar in its physical properties to that obtained by direct copolymerization of glycol acrylates or methacrylates with a minor amount of a cross-linking agent.

Subsequent cross-linking of the soluble glycol methacrylate or -acrylate polymers can be advantageously utilized also for many technologic operations such as forming of insoluble hydrogel on fabrics, webbings, yarns, paper or similar, for molding and extruding various shaped articles such as semipermeable sheets for dialysis, tubes and their linings for hydrocarbons and hydrocarbons oils, special coatings, surgical articles and facilities etc.

If monomeric glycol acrylate or -methacrylate or other monomer is added as "active solvent", its amount is not limited by consideration which are valid for other solvents, e.g. by the possibility of building a spongy polymer arising e.g. in the case of excessive water, or insufficient cross-linking in the case of good solvents. Thus, the amount of the monomer can vary between 0.5 and 95 percent by weight. The degree of shrinking caused by polymerization depends, of course, on the amount of the monomer.

The decreased amount of the monomer in comparison with usual polymerisation casting has also the advantage of lower sensibility of the polymerizing mixture against oxygen. Moreover, it is often possible to use glycol acrylate or -methacrylate containing a higher amount of the corresponding diester than in the usual polymerization-casting process.

Parameter $\chi$ is well known to those skilled in the art and can be derived from either dissolving or swelling properties of polymers using the method described e.g. in the textbook P.J. Flory, Principles of Polymer Chemistry, New York, Cornell University Press, Ithaca 1953, Chapter XIII. Some typical embodiments of the invention are disclosed in following nonlimiting Examples. Example 1

Noncrosslinked soluble monomer was prepared according to the French Patent Specification No. 1,523,779 by polymerizing ethylene glycol monomethacrylate, containing 1.5 percent of the bismethacrylate, in a 10 percent solution in ethanol in presence of 0.5 percent of dibenzoyl peroxide onto the monomer under pure nitrogen. The polymerization was carried out by boiling the mixture under reflux for 5 hours. Ethanol was then distilled off under reduced pressure and the polymer was plastified with humid glycerol (containing 10 percent of water). Subsequent cross-linking was carried out by heating the plastified polymer, containing still some dibenzoyl peroxide, to 130° C. The cross-linking could be established from 85° C. upwards. Example 2

Soluble polymer prepared according to Example 1 was cast on a horizontal glass plate and the solvent evaporated. The foil thus obtained was plastified by adding 5 percent (weight) of water, computed from the weight of the foil, immersed into silicon oil and heated therein for 1 hour at 120° VC. Thereafter the foil was washed in ethyl acetate. It swelled in water, ethanol and other solvents but was insoluble therein. Example 3

The solution of the soluble glycol methacrylate polymer in ethanol, prepared according to Example 1, was conventrated by evaporating the solvent from original 8 percent to 20 percent of dry substance. The viscous solution was applied in four subsequent layers onto a knitted polyester tubing, put on a pin made from rustless steel and rotating round its longitudinal axis. After evaporating ethanol at ambient temperature the whole was soaked in water to the equilibrium and heated in a closed container to 105° C. for 45 minutes. Water was partly evaporated and the polymer irreversibly cross-linked The armed hydrogel tube thus obtained was used as a prosthesis of Fallopian tube (ovidnet). Example 4

The polymer solution obtained according to Example 1 was concentrated by evaporation to 30 percent of dry substance and the viscous solution used for impregnating a polyester fiber gauze in such a way that no mesh remained free. The gauze was then irradiated simultaneously by infrared and ultraviolet radiation. A THIN ARMED INSOLUBLE HYDROGEL FOIL WAS OBTAINED, WHICH COULD BE USED FOR SURGICAL PURPOSES. Example 5

The ethanolic polymer solution obtained by the solvent polymerization according to Example 1 was diluted with monomeric ethylene glycol monomethacrylate containing 0.44 percent of ethylene glycol bismethacrylate. Ethanol was evaporated and 0.2 percent of di-isopropyl percarbonate was added. The mixture containing 10 weight percent of the polymer and90 percent of the monomer was then cast in a mold to form a sheet and polymerized at 50° C. during 30 minutes. Example 6

Ethanolic solution of the polymer obtained according to Example 1 was poured into an excess of ethyl acetate and the powdered polymer dried and mixed with 0.5 percent (weight) of dibensoil peroxide. The powder was mixed with glycol monomethacrylate monomer, containing 0.7 percent of the diester, and the pasty mixture applied as top layer of a similar paste prepared in the same way from powdered methyl methacrylate and liquid methyl methacrylate monomer, said paste being filled into a mold for making artificial denture. Both pastes were colored in usual way. The mold was then heated to cause polymerization. The denture thus obtained had a hard skeleton with a soft hydrogel top layer forming an adhering pad. Example 7

Soluble polymer obtained in ethanolic solution according to Example 1 was made free of low-molecular fractions by precipitating the solution by pouring it into such an amount of water (about 400 percent by volume that about 80 percent of the polymer was recuperated. The aqueous ethanol was removed by decantation and the copolymer was washed in a 20 percent aqueous ethanol solution. Then the solvents were evaporated and the polymer plastified with 3.5 percent of monomeric ethylene glycol monomethacrylate containing 2 percent of the diester. 0.01 percent by weight of dibensoyl peroxide (onto the polymer) was added and the homogenized mixture molded at 110° C. for 5 minutes. The molding was clear and in swollen condition optically homogeneous. It was suitable for manufacturing hdyrogel contact lenses. Example 8

The soluble polymer obtained in ethanolic solution according to Example 1 was precipitated and dried to a powder as disclosed in Example 6. It was mixed with 0.5 percent of finely powdered potassium persulfate and kept in a sealed container. 1.5 percent diethylaminoethyl acetate was dissolved in a mixture of 80 percent ethylene glycol monomethacrylate (containing 0.3 percent of the diemthacrylate) and 20 percent of water. The powdered polymer was mixed with the monomer solution to a paste which was filled into a mold. During several minutes the mass was cross-linked to an insoluble hydrophilic copolymer. Example 9

The process described in Example 8 was repeated except that 15 percent of finely powdered silica was added to the powdered soluble polymer. The monomer was diluted, instead of water, with 50 percent of glycerol. The cross-linked molding thus obtained was tougher and stronger than that according to Example 8. By washing out glycerd and replacing it by water the molding shrunk slightly, in contradicstinction with the molding prepared according to Example 8, which, when thoroughly washed in water, became slightly swollen. Example 10

To show the influence of a bad solvent onto the cross-linking a series of experiments was carried out, in which the solubility of a foild of a soluble copolymer with different starting amounts of water was tested after certain time intervals of heating to 100, 110 and 120° C. The soluble copolymer was obtained by copolymerization of 20 parts of ethyleneglycol monomethacrylate with 1.4 percent of the diemthacrylate in 80 parts of dimethylformamide in presence of 0.5 percent of dibenzoyl peroxide (on the monomer). The viscous solution thus obtained was poured in an excess of water and the precipitate was vacuum-dried at ambient temperature. The copolymer was then dissolved in anhydrous methanol and the solution poured onto a horizontal glass plate. The foil obtained upon evaporation of the solvent was humidified with water to a certain water content, weighted and heated in silicon oil to 100, 110 and 120° C. After certain time intervals was the foil immersed into 96 percent ethanol (containing 1 percent percent of and the washed and dried remainder weighed. It was found that at higher starting water content the 100 percent insolubility was sooner attained than at lower water content. e.g. was the insoluble remainder after 45 minutes heating to 100° C. at the starting content of 5.5 percent water only 15 percent, at 18.25 percenof water 70 percent and at 33 percent of water 100 percent. At 110° C. with 8.7 percent of water the insoluble part of the copolymer amounted, after 45 minutes to 30 percent, with 15.8 percent of water to 75 percent and with 29 percent of water to 100 percent etc. Similar results were obtained if water was replaced by glycerol.

If methacrylic esters were replaced in the foregoing Examples by acrylic esters, the results were very similar. The acrylic hydrogels were, however, somewhat more soluble and less resistant to hydrolytic attack.

If ethylene glycol was partly replaced by diethylene glycol or triethylene glycol, the cross-linked copolymers were more swellable in water. Propylene glycol esters yielded, on the contrary, less swellable cross-linked copolymers.

We claim:

1. A method of preparing insolbulecrosslinked hydrogel polymers from a monomeric mixture consisting essentially of at least 50 percent by weight of said mixture of ethyleneglycol, diethyleneglycol or triethyleneglycol mono-ester of acrylic or methacrylic acid and at least 0.05 percent by weight of said mixture of a diester of ethyleneglycol or diethyleneglycol diacrylate or dimethacrylate comprising the steps of
   a. initially copolymerizing said mono-ester and di-ester in a solvent medium having an interaction parameter with respect to the resultant polymer of less than 0.5 under conditions of free radical polymerization until a noncross linked polymer having olefinic double bonds is obtained which is soluble in methanol and having molecular weight of at least 40.000,
   b. removing at least a substantial amount of said solvent from the noncrosslinked polymer, and
   c. thereafter continuing copolymerization of said soluble non cross linked polymer at polymerization conditions until an insoluble crosslined copolymer is obtained.

2. Method as set forth in claim 1, wherein the final step of cross-linking is carried out by heating to temperatures ranging from 85 to 200° C.

3. Method as set forth in claim 1, wherein the final step of cross-linking is carried out in presence of an added major amount relative to said monomers of a comonomer capable of copolymerization with the said soluble copolymer.

4. Method as set forth in claim 1, wherein the final step of cross-linking is carried out in presence of solvents, having the interaction parameter with respect to the polymer thus formed higher than 0.5.

5. Method as set forth in claim 1, wherein the final step of cross-linking is carried out in presence of polymerization initiators liberating free radicals.

6. Method as set forth in claim 1, wherein the final step of cross-linking is carried out by irradiating with ionizing rays.